April 14, 1959 C. F. MORRISON 2,882,064
WHEELED CONVEYORS FOR ELONGATED OBJECTS
Filed Oct. 25, 1955 2 Sheets-Sheet 2
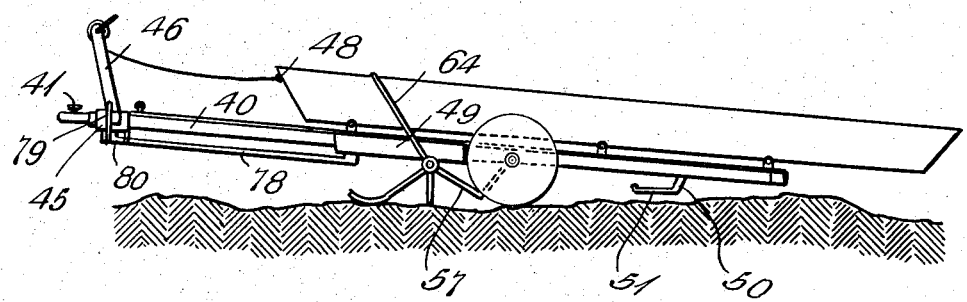
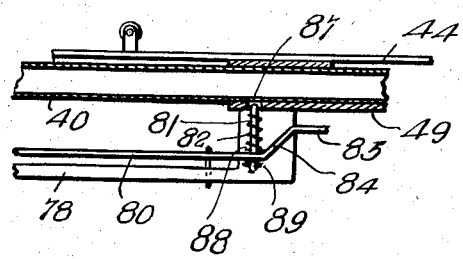
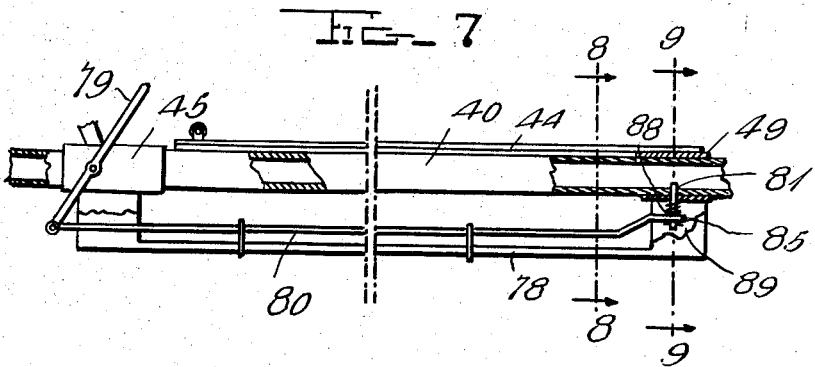
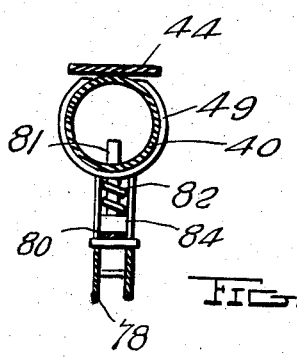
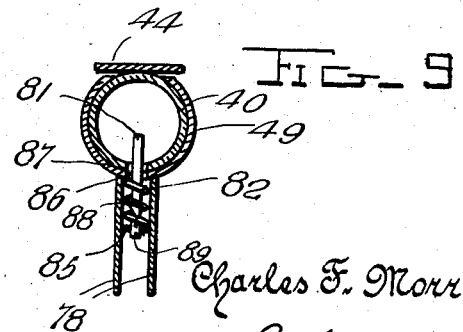
INVENTOR
Charles F. Morrison,
BY Linton and Linton
ATTORNEYS

United States Patent Office 2,882,064
Patented Apr. 14, 1959

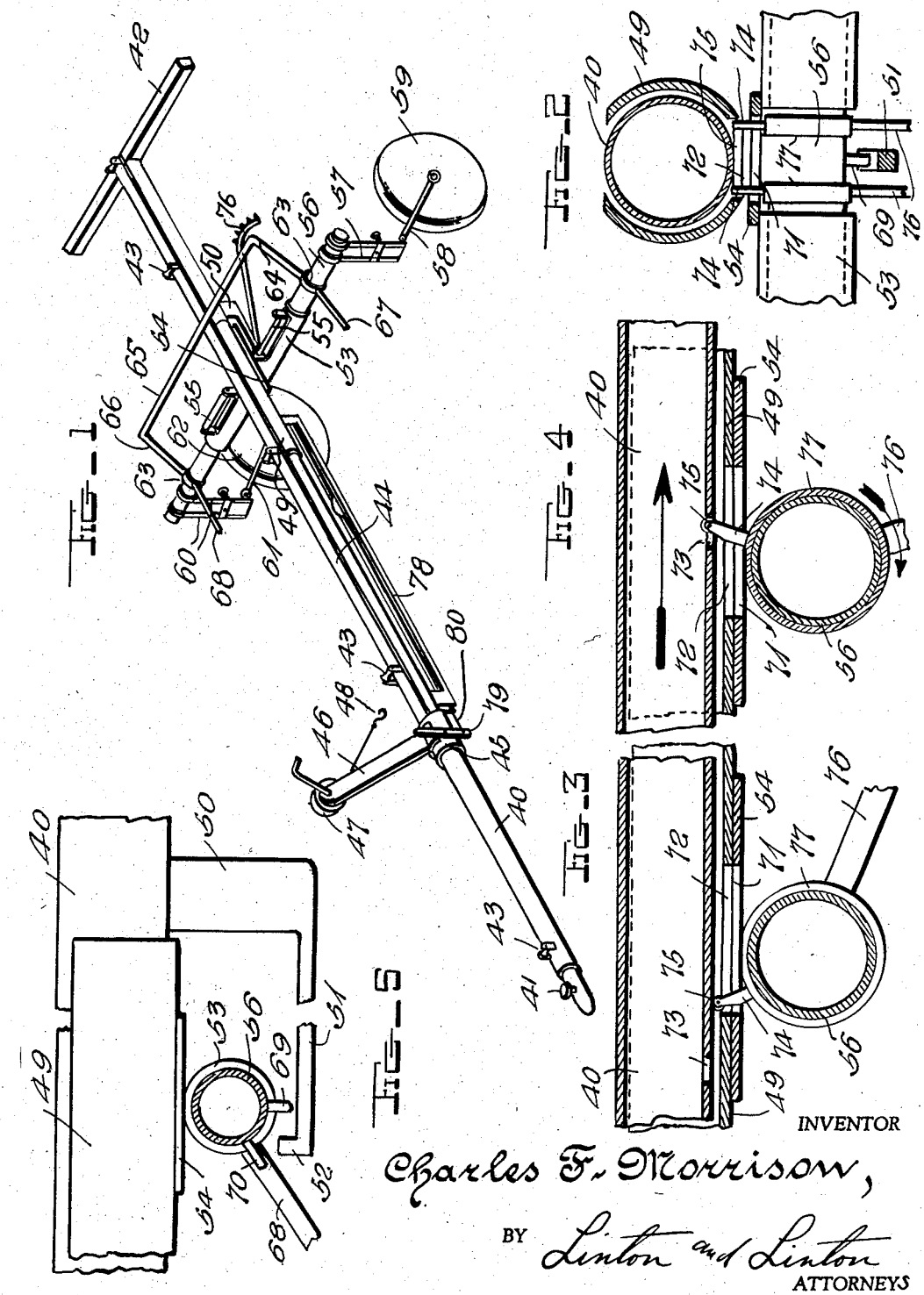

2,882,064

WHEELED CONVEYORS FOR ELONGATED OBJECTS

Charles F. Morrison, Chattanooga, Tenn.

Application October 25, 1955, Serial No. 542,701

3 Claims. (Cl. 280—44)

The present invention relates to wheeled conveyors to be towed behind a prime mover and is more particularly concerned with a wheeled trailer for loading, conveying and unloading boats or other relatively heavy objects.

The principal object of the present invention is to provide an economically producible wheeled carrier for being towed by a vehicle or the like and which conveyor is self-lowering and raising through the movement of the connected elements thereof.

A still further and equally important object of the present invention is to provide a wheeled conveyor for elongated objects such as small boats and which conveyor while attached to its prime mover will lower the article conveyed towards the ground or lift the same upwardly through the movement of the prime mover.

A further important object of the invention is to provide a towable wheeled conveyor particularly for supporting boats which automatically raises and lowers the conveying wheels, moves the supporting boom longitudinally, permitting the tilting or levelling thereof and at the same time operates a means for holding the boat on the conveyor or releasing the same while operating ground levers for supporting the conveyor upon the ground during said periods as when the wheels are in their raised position.

Other objects of the invention will be in part obvious and in part pointed out in the following detailed description of the accompanying drawings, in which:

Fig. 1 is a perspective view of a conveyor according to the invention.

Fig. 2 is an enlarged detailed sectional view of the ground lever and axle operating members of said conveyors.

Fig. 3 is a longitudinal section of the ground lever operating members with the lever in its inoperative position.

Fig. 4 is a view similar to Fig. 3 but with the elements in their position when the ground lever is in its ground contacting position.

Fig. 5 is an enlarged detailed view of the axle rotating elements.

Fig. 6 is an enlarged detailed view partly in section of the boom unlocking means.

Fig. 7 is a further enlarged detailed view of the controls for the boom unlocking means and connector for the boom supports.

Fig. 8 is an enlarged cross sectional detail view taken on line 8—8 of Fig. 7.

Fig. 9 is an enlarged cross sectional detail view taken on line 9—9 of Fig. 7.

Fig. 10 is a side elevation of the conveyor of Fig. 1 also in its boat loading or unloading position.

Referring now more particularly to the accompanying drawing wherein like and corresponding parts are designated by similar reference characters there is shown a conveyor which has an elongated boom 40, hitch attaching knob 41 and cross bar 42 with intermediate rollers 43 and a strip 44 extending along the major portion of the top of said boom.

A sleeve 45 has boom 40 slidably extending therethrough and supports an upright 46 upon which is mounted a winch 47 having a cable with a hook end 48.

An open top sleeve 49 has said boom 40 slidably mounted therethrough and rearwardly of said sleeve namely to the right of Fig. 1 a J-shaped control arm 50 is fixedly mounted to the bottom of said boom. Said arm has an elongated base 51 ending in stop 52.

A split sleeve 53 connected together by a plate 54, which also fixedly supports sleeve 49, has a pair of rollers 55 mounted on the top thereof.

An axle 56 extends through said split sleeve 53 and is rotatable therein. A pair of arms 57 are fixedly connected to an end of said axle and extend radially therefrom. Connecting rods 58 are pivotally connected to the end of said arms and are also connected to the axle of a wheel 59.

A pair of arms 60 are connected to the opposite end of said axle and extend radially therefrom while pivotally supporting rods 61 which extend from the end thereof and are connected to the axle of the wheel 62. Rods 58 and 61 extend at an angle from arms 57 and 60 respectively.

A pair of collars 63 are fixedly connected each to an opposite end portion of said axle and are further connected by a hold down frame consisting of an upright 64, band or belt 65 and a second upright 66 with both uprights extending radially from said axle.

In addition, collars 63 have a pair of ground rods 67 and 68 each extending radially from one of said collars forwardly of the conveyor or to the left of Fig. 1.

Axle 56 at the point thereof beneath said sleeve has a pair of radially extending fixed fingers 69 and 70 which extend for being engaged by a stop 52 whereby axle 56 will be rotated by the sliding of boom 40.

Plate 54 has an opening 71 as does sleeve 49, namely opening 72 directly above opening 71. Boom 40 has a lateral slot 73 formed in the bottom thereof at a point just left or forward of axle 56 when the boom is in the position for conveying as shown in Fig. 1. A pair of control arms 74 are connected together by a roller 75 supporting the bottom of boom 40 and capable of insertion within slot 73. A pair of ground levers 76 extend radially from a pair of rings 77 rotatably mounted on axle 56 and having said arms 74 likewise extending radially therefrom.

Collar 45 has a control lever 79 pivotally connected to the side thereof for operating a slide 80 which controls means for locking and unlocking sleeve 49 to boom 40. Connectors 78 fixedly connect sleeve 49 to collar 45 and slidably support slide 80. Said locking and unlocking means as shown in Figs. 6–9 inclusive consist of a pin 81 surrounded by a coil spring 82 bearing on slide 80 and against sleeve 49. Said pin 81 at its lower end extends through a longitudinal slot 83 in slide 80 and its angular end portions 84 and 85, while a projection 88 extends from pin 81 above said slide across slot 83 and a second projection 89 extends from said pin below said slide across slot 83 for moving said pin up and down as said slide is moved past said projection. The upper end of pin 80 extends into an opening 86 in sleeve 49 which opening is capable of alignment with an opening 87 in boom 40. Movement of lever 79 to the right of Fig. 7 moves slide 80 so that the bent ends 84 and 85 push against projection 88 and thus moves pin 81 through openings 86 and 87 when they are in alignment retaining boom and sleeve 49 together. Movement of lever 79 in the opposite direction moves slide end portions 84 and 85 against projection 89 to the position of Fig. 6 whereupon pin 81 is withdrawn releasing the boom and sleeve.

The aforementioned conveyor is capable of loading, supporting and discharging elongated objects of various types such as crates, boats and the like, but the operation thereof is hereinafter described by way of example only as being employed in connection with a motor vehicle for drawing the same and for conveying small boats.

In the trailer knob 41 is for attachment to the trailer hitch, while boom 40 is slidable upon sleeve 49 except when retained by pin 81 which is operated by lever 79 controlling slide 80 which operates said pin. When lever 79 is moved to the left and the pin 81 retracted from openings 86 and 87 as in Fig. 6, the backing of the towing vehicle will cause boom 40 to slide rearwardly which produces a two-fold action. One, is the movement of arm 50 with said boom causing stop 52 to engage finger 69 rotating axle 56 and thus moving wheels 59 and 62 to the rear and upwardly lowering the trailer. At the same time hold down frame 65 is moved forwardly and ground rods 67 and 68 move downwardly for engaging the ground and supporting the axle.

At the same time boom 40 moving rearwardly brings opening 73 across the top of roller 75 whereupon the roller enters said slot and causes the pivoting of fingers 74, rings 77 and the ground levers 76 in order that these ground levers engage the ground and the trailer assumes the position shown in Fig. 6. Namely lowered with the boom tilting downwardly towards the rear in order that a hook 48 can engage the boat A and upon operation of winch 47 the boat will be drawn onto the rollers 43 and 55.

Upon forward movement of the towing vehicle boom 40 will be drawn forwardly with ground levers 76 preventing a similar movement of the axle until rollers 75 again enter slot 73 and pivot the ground levers rearwardly to the position of Fig. 1 where they are locked by the bottom surface of said boom covering rollers 75.

At the same time arm 50 moves forward so that stop 52 engages finger 70 rotating axle 56 and bringing the wheels 59 and 62 forwardly and to a raised position as in Fig. 1. Also ground rods 67 and 68 are returned to their raised position and frame 65 brought downwardly on the top of the boat for retaining the same during the travelling of the trailer. Movement of lever 79 to the line then moves pin 81 into openings 86 and 87 retaining said boom in sleeve 49. Reenactment of this procedure permits the connection and easy unloading of the boat.

The present trailer is capable of considerable modification and such changes thereto as come within the scope of the appended claims are deemed to be a part of the invention.

What I claim is:

1. A wheeled conveyor for elongated objects comprising an axle, wheels connected to, but offset from said axle, a boom, means having said axle axially rotatable therein and said boom slidably mounted thereon laterally of said axle, ground levers pivotally connected to said axle and capable of contacting the ground when pivoted, means operable by the sliding of said boom for pivoting said ground levers, fingers extending from said axle, a lever carried by said boom and capable of engaging said fingers for rotating said axle upon the sliding of said boom and thereby raising and lowering said wheels and means for at times retaining said boom from movement relative to said axle.

2. A wheeled conveyor for elongated objects comprising an axle, wheels, means extending radially from said axle and connected to said wheels, a boom, means having said axle axially rotatable therethrough and slidably supporting said boom laterally of said axle, fingers extending radially of said axle, an arm carried by said boom for engaging said fingers and rotating said axle upon sliding of said boom whereby said wheels and thereby said conveyor are raised and lowered relative to the ground.

3. A wheeled conveyor for elongated objects comprising an axle, wheels connected to, but offset from said axle, a sleeve having said axle axially rotatable therethrough, a second sleeve mounted on but laterally of said first mentioned sleeve, a boom slidably mounted longitudinally of said second sleeve, said first and second sleeves having coinciding openings, said boom having a lateral slot, rings slidably mounted on said axle, control fingers extending from said rings through said sleeve openings and capable of being inserted in said boom slot during the sliding of said boom and ground levers extending from said rings whereby said levers are pivoted when said fingers engage said boom slot for engaging or disengaging the ground and at times limiting the movement of said conveyor.

References Cited in the file of this patent
UNITED STATES PATENTS

| | | |
|---|---|---|
| 2,727,758 | Smith | Dec. 20, 1955 |
| 2,740,639 | Eckroad | Apr. 3, 1956 |
| 2,753,064 | Lesser | July 3, 1956 |